United States Patent
Oomori

(10) Patent No.: US 8,116,637 B2
(45) Date of Patent: Feb. 14, 2012

(54) OPTICAL TRANSMITTER WITH A CHIRP MANAGED LASER DIODE AUTOMATICALLY ADJUSTING EMISSION WAVELENGTH THEREOF AND ITS ADJUSTING METHOD

(75) Inventor: Hirotaka Oomori, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 851 days.

(21) Appl. No.: 12/247,461

(22) Filed: Oct. 8, 2008

(65) Prior Publication Data

US 2009/0097863 A1    Apr. 16, 2009

(30) Foreign Application Priority Data

Oct. 10, 2007 (JP) ................................. 2007-264813

(51) Int. Cl.
*H04B 10/04* (2006.01)
*H04B 10/12* (2006.01)

(52) U.S. Cl. ...................................................... 398/196

(58) Field of Classification Search ........... 398/195–196
See application file for complete search history.

(56) References Cited

U.S. PATENT DOCUMENTS

| | | | |
|---|---|---|---|
| 6,704,334 B2 * | 3/2004 | Yokoyama | ................. 372/29.02 |
| 7,161,725 B2 * | 1/2007 | Fraser et al. | .................. 359/238 |
| 2005/0169642 A1 | 8/2005 | Mahgerefteh et al. | |
| 2005/0286829 A1 | 12/2005 | Mahgerefteh et al. | |
| 2006/0029397 A1 | 2/2006 | Mahgerefteh et al. | |
| 2006/0039502 A1 | 2/2006 | Mahgerefteh et al. | |

OTHER PUBLICATIONS

Matsui et al., "Chirp-Managed Directly Modulated Laser (CML)", IEEE Photonics Technology Letters, vol. 18, No. 2, pp. 385-387Jan. 15, 2006.

Mahgerefteh et al., "Error-free 250 km transmission in standard fibre using compact 10 Gbit/s chirp-managed directly modulated lasers (CML) at 1550 nm", Electronics Letters, vol. 41, No. 9, 2 pages, Apr. 28, 2005.

* cited by examiner

*Primary Examiner* — Shi K Li

(74) *Attorney, Agent, or Firm* — Venable LLP; Michael A. Sartori

(57) ABSTRACT

An optical transmitter using a chirp managed laser is disclosed. The optical transmitter compares, in advance to the ATC operation, the phases of the signal corresponding to the original output of the LD and the signal corresponding to that reflected by the filter. When the two signals are in phase, the transmitter lowers the target temperature of the ATC loop to shift the emission wavelength of the LD shorter until the two signals are out of phase.

10 Claims, 7 Drawing Sheets

Output from 1st PD — GND

Output from 2nd PD — GND

— GND

Output from
1st PD

Output from
2nd PD

OPTICAL TRANSMITTER WITH A CHIRP MANAGED LASER DIODE AUTOMATICALLY ADJUSTING EMISSION WAVELENGTH THEREOF AND ITS ADJUSTING METHOD

BACKGROUND OF THE INVENTION

1. Field of the Invention

The present invention relates to an optical transmitter, in particular, the invention relates to a transmitter used in an optical communication system with a long reach.

2. Related Prior Art

The long distance communication is currently limited to 80 to 100 km for the transmission speed of 10 Gbps without any repeater and dispersion compensation. A report of IEEE Photonics Technology Letters, 2006, vol. 18(2) by Mahgerefteh et al., has proposed one of techniques to extend the transmission range, which is called as the chirp managed laser (hereafter denoted as CML) technique.

An optical transmitter implementing the CML technique suppresses the transition chirp by applying relatively larger bias current and smaller modulation current to a laser diode (hereafter denoted as LD) and obtains a substantial extinction ratio of the output from the transmitter by filtering a component corresponding to the signal "0" with an optical filter having a sharp cut-off characteristic.

Such a filter with the sharp cut-off may be a Fabry-Perot Etalon filter with a periodic transmission spectrum, that is, the Fabry-Perot Etalon filter has a plurality of transmission maxima. Accordingly, it may occur that the emission wavelength of the LD is not always matches with one of the cut-off frequencies of the filter. Moreover, when the emission wavelength matches with one of cut-off frequencies of the filter to cut shorter frequencies, the filter cuts the component "1", which not only degrades the extinction ration of the transmitter but reverses the phase of the optical signal.

SUMMARY OF THE INVENTION

One aspect of the present invention relates to a configuration of an optical transmitter. The optical transmitter of the invention includes a laser diode (LD), an optical filter, first and second photodiodes (hereafter denoted as PD), an automatic temperature control (hereafter denoted as ATC) circuit, and a controller. The LD outputs modulated signal light that contains two spectral peak wavelengths each corresponding to a status "1" component and a status "0" component. The optical filter has a transmission spectrum showing a plurality of transmission maxima and a reflection spectrum showing a plurality of reflection minima corresponding to the transmission maxima. The optical filter transmits a portion of the modulated light coming from the LD, while, it reflects another portion of the modulated light. The first PD detects a portion of the modulated light emitted from the LD, while, the second PD detects a portion of the other portion of the modulated light reflected by the optical filter. The ATC circuit sets a temperature of the LD in a target temperature. In the present invention, the controller lowers the target temperature referred by the ATC circuit when the outputs of the first and second PDs are in phase to each other until the outputs thereof become out of phase.

When the outputs of two PDs are in phase to each other, the emission wavelength of the LD is in irregular relation with respect to the transmission spectrum of the optical filter. That is, in the irregular relation, the optical filter primarily cuts the "1" component among two components involved within the modulated light output from the LD, which degrades the extinction ratio of the signal light output from the transmitter. While, in an ordinary relation between the emission wavelength of the LD and the transmission spectrum of the filter, the filter may primarily cut the "0" component contained in the modulated light, which not only secures the extinction ratio of the signal light but may narrow the spectral width thereof because the signal light only contains the "1" component.

Another aspect of the invention relates to a method to control a wavelength of the signal light output from the optical transmitter. The method includes: (a) detecting the modulated light output from the LD without interposing the optical filter, (b) detecting the reflected light that is reflected by the optical filter, and (c) lowering a temperature of the LD when the reflected light is in phase with respect to the modulated light until the reflected light is out of phase with respect to the modulated light.

DESCRIPTION OF PREFERRED EMBODIMENTS

Next, preferred embodiments according to the present invention will be described as referring to accompanying drawings.

Figure 1:
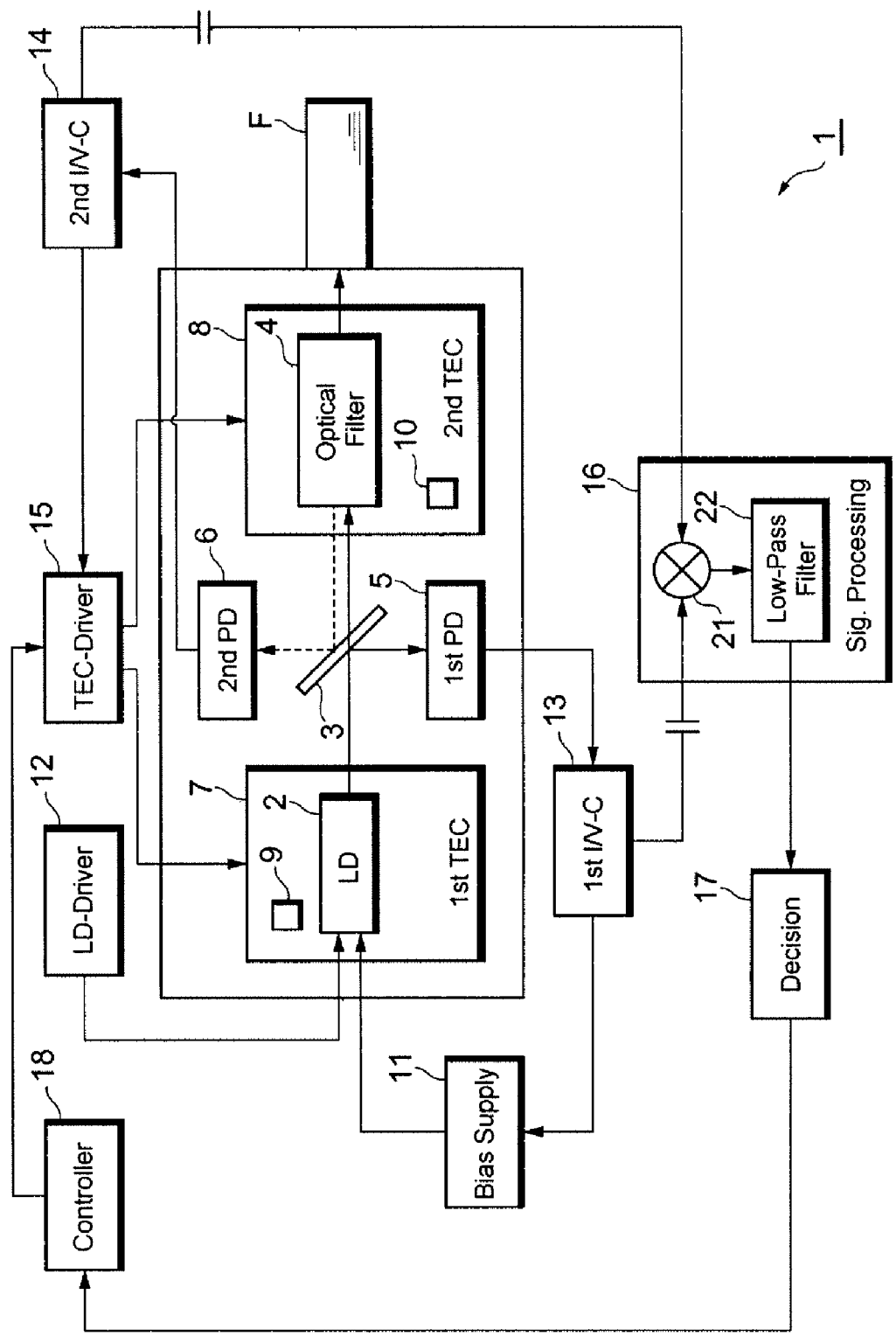
FIG. 1 is a functional block diagram of the optical transmitter according to an embodiment of the invention.

FIG. 1 illustrates a functional block diagram of an optical transmitter according to an embodiment of the invention. The optical transmitter 1 comprises an LD 2, a beam splitter 3, an optical filter 4, a first photodiode (hereafter denoted as PD) 5, a second PD 6, a first thermo-electric cooler (hereafter denoted as TEC) 7, a second TEC 8, a firs thermistor 9 and a second thermistor 10.

The optical transmitter 1 further comprises, as circuit units, a bias supply 11, an LD driver 12, a first current-to-voltage converter (hereafter denoted as I/V-C) 13, a second I/V-C 14, a TEC driver 15, a signal processor 16, a decision unit 17 and a controller 18.

The LD 2 may be a distributed feedback laser diode (hereafter denoted as DFB-LD), which emits light by being applied a current supplied from the bias supply 11. The optical signal output from the LD 2 couples with the optical fiber F through the beam splitter 3 and the optical filter 4. The optical signal includes at least two components, each corresponding to status "0" and status "1", with specific wavelengths different from each other.

The beam splitter 3, set between the LD 2 and the optical filter 4, divides the optical signal coming from the LD 2 into two beams, one of which heads for the optical filter 4 while the other heads for the first PD 5. The beam splitter 3 guides light reflected by the optical filter 4 to the second PD 6.

Figure 2:
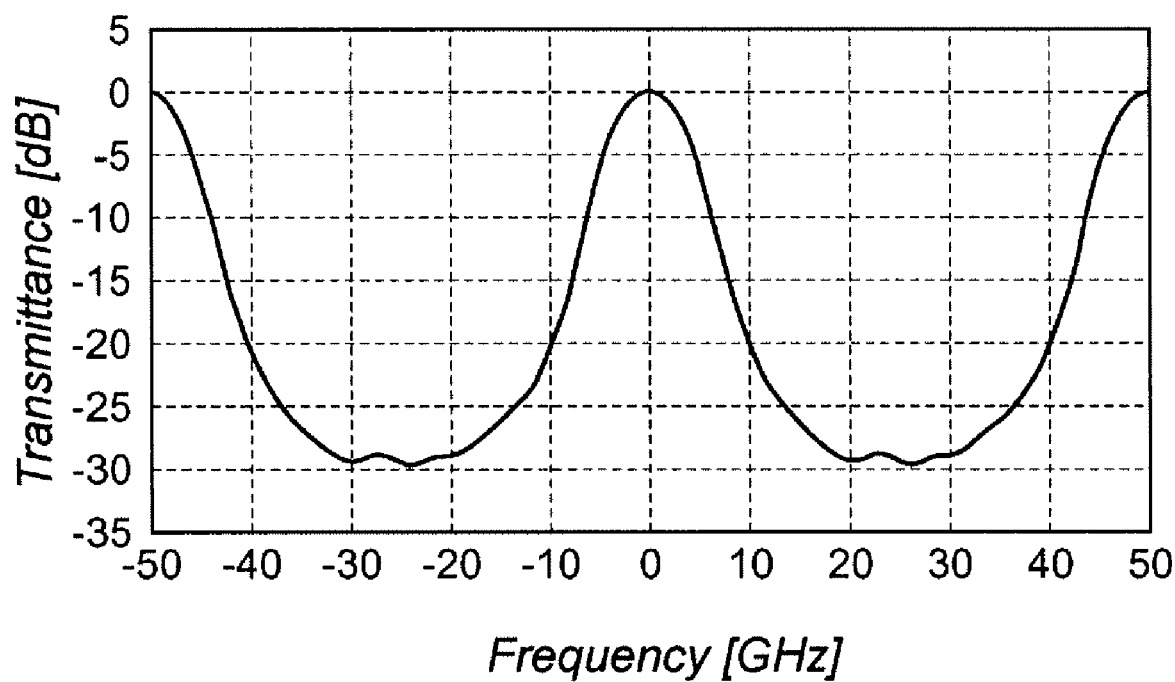
FIG. 2 shows a typical transmission spectrum of the optical filter implemented in the optical transmitter shown in FIG. 1.

The optical filter may be a type of Fabry-Perot etalon filter with a periodic transmission spectrum each showing a narrow bandwidth. FIG. 2 is an example of the transmission spectrum of the optical filter 4 type of the Fabry-Perot etalon. FIG. 2 shows two transmission maxima with a span of around 50 GHz. In an ordinary operation of the transmitter, the optical filter 4, in particular, the transmission spectrum thereof is set so as to cut the component "0" in the optical signal output from the LD 2. The carrier distribution in the bands, in other words, the dynamics of the population inversion in the bands, may shift the emission wavelength for the component "0" from that for the component "1", which is called as the adiabatic chirp of the LD.

The first PD 5 detects the light emitted from the LD 2 and split by the beam splitter 3, and outputs an electrical signal to the first I/V-C 13. The second PD 6 detects the light reflected by the filter 4, and outputs another electrical signal to the second I/V-C 14.

The first TEC 7 controls a temperature of LD 2, while, the second TEC 8 controls a temperature of the filter 4. These TECs, 7 and 8, may include thermo-electric elements such as Peltier element, and may be controlled by the TEC driver 15.

The first thermistor 9 is placed immediate to the LD 2 to sense a temperature of the LD 2, while, the second thermistor 10 is set immediate to the filter 4 to detect a temperature of the filter 4. These thermistors, 9 and 10, each outputs a signal corresponding to the sensed temperature to the TEC driver 15.

The bias supply 11 provides a bias current enough to suppress the transient chirp to the LD 2. The first I/V-C 13 converts the current signal from the first PD 5 into a voltage signal and sends thus converted voltage signal to the bias supply 11 and the signal processor 16. The second I/V-C 14 converts the current signal from the second PD 6 into another voltage signal and sends this converted voltage signal to the TEC driver 15 and to the signal processor 16.

The LD driver 12 superposes a modulation current with high frequency components to the LD 2. This modulation current may modulate the optical output from the LD 2 so as to generate a digital data including the components "0" and "1". The TEC driver 15, based on the output from the first and second thermistors, 9 and 10, drives the first TEC 7 and the second TEC 8. The TEC driver may adjust the temperature of the LD 2 and that of the filter 4 in respective requested temperatures and may maintain the temperatures thereof in these requested temperatures.

The first I/V-C 13 and the bias supply constitute an automatic power control (hereafter denoted as APC) circuit, in which the APC circuit adjusts the bias current provided to the LD 2 so as to maintain the optical power output from the LD 2, which is detected by the first PD 5, to be constant in a preset power under a condition where the temperature of the filter 4 is set constant.

Moreover, the first thermistor 9, the first TEC 8, the second I/V-C 14 and the TEC driver 15 constitutes an automatic temperature control (hereafter denoted as ATC) circuit. This ATC circuit controls the temperature of the LD 2 so as to maintain the optical power detected by the second PD 6 constant.

The signal processor 16 comprises a phase comparator 21 and a low-pass filter 22. The phase comparator 21 compares the phase of signals each output from the first I/V-C 13 and the second I/V-C 14. An output of the signal processor 16 becomes positive when relative phase difference between two signals is in a range of 0±90°, while it turns negative when the phase difference is in a range of 180±90°. The decision circuit 17 receives the output of the signal processor 16 through the low-pass filter 22.

The decision circuit 16 decides whether the relation between the emission wavelength of the LD 2 and the cut-off wavelength of the filter 4 shows a normal relation or not through the sign of the output of the signal processor 16. When the output from the processor 16 is negative, the decision circuit 16 decides the relation above is in a normal condition, while, the decision circuit 17 decides that the relation between the emission wavelength of the LD 2 and the cut-off wavelength of the filter 4 is in an irregular condition. The decision circuit 16 transfers this result to the controller.

The controller 18 presets a target temperature of the LD 2. Specifically, the controller 18, based on the result sent from the decision circuit 16, commands the TEC driver 15 so as to lower the target temperature of the LD 2 when the result indicates that the emission wavelength of the LD 2 is inconsistent with the cut-off wavelength of the filter 4. The controller 18 repeats the operation to send the command above to the TEC driver 15 until the result of the decision circuit 16 reverses to show the relation between the emission wavelength of the LD 2 and the cut-off wavelength of the filter 4 is in an ordinary condition. The revise of the target temperature may be carried out by changing a preset value corresponding to the resistance of the first thermistor 9.

Next, an operation of the optical transmitter 1 will be described.

Figure 3:
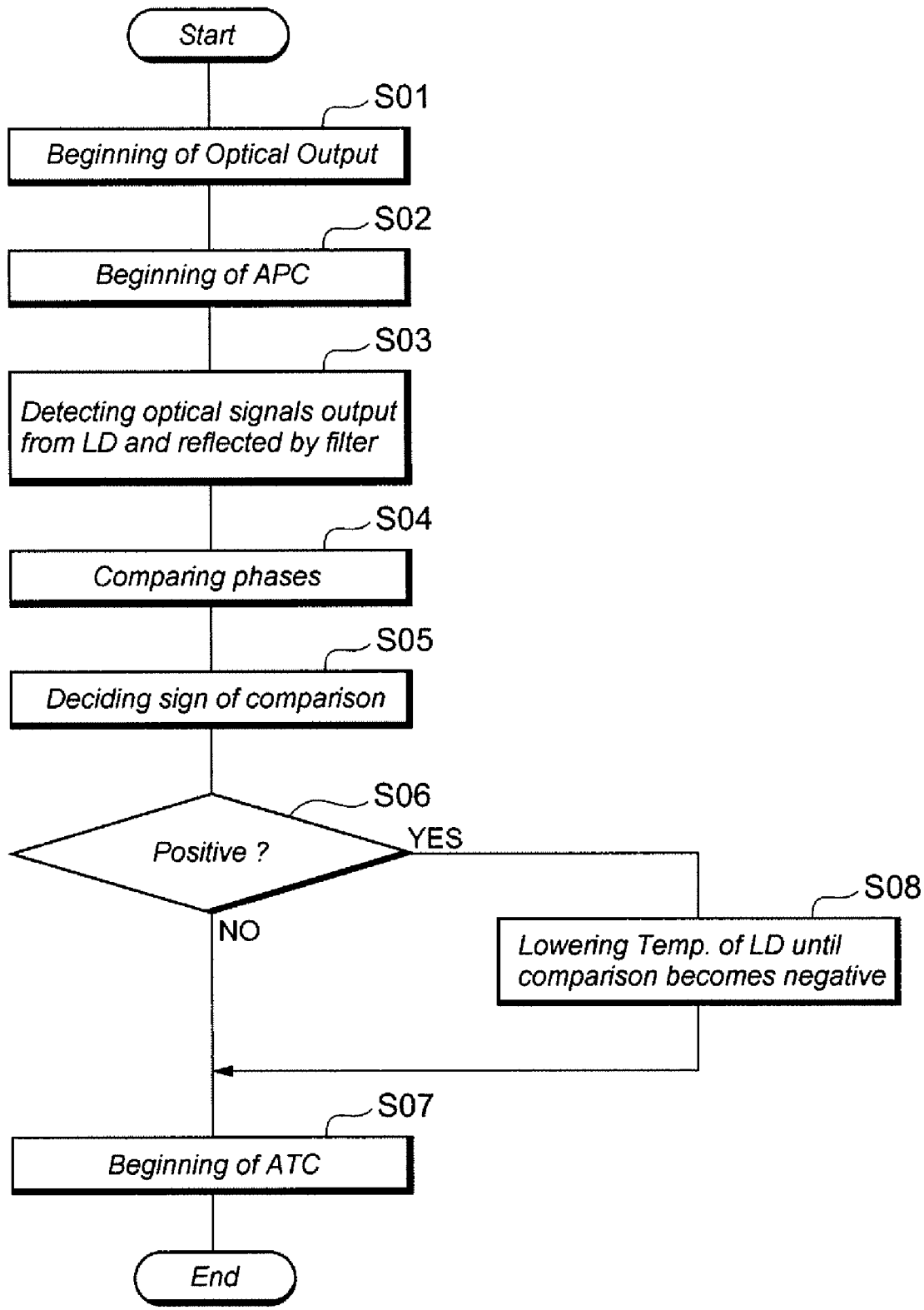
FIG. 3 shows a flow chart to operate the optical transmitter shown in FIG. 1.

FIG. 3 is a flow chart to show an operation of the optical transmitter 1 shown in FIG. 1. First, turning on the transmitter 1, the ATC control adjusts the temperature of the LD 2 and that of the filter 4 in respective preset temperatures. Stabilizing the temperature of the LD 2 and the filter 4 in respective preset temperatures, the transmitter 1 outputs the optical signal, step S01. Subsequently, the APC control adjusts the average power and the extinction ratio of the optical output of the transmitter 1, step S02.

The second thermistor 10, the second TEC 8 and the TEC driver 15, which constitutes a first ATC loop, maintains the temperature of the filter 4 constant. Under such a condition where the temperature of the filter 4 is kept constant, the APC circuit adjusts the bias current supplied to the LD 2 so as to keep the optical output detected by the fist PD 5 constant in a predetermined value.

As illustrated in FIG. 2, the filter 4 may be the Fabry-Perot Etalon filter with a plurality of transmission maxima. Accordingly, the emission wavelength of the LD 2 dose not always show the one-to-one correspondence with the output power from the filter. In other words, even the optical power output from the filter 4 is in a target value, the wavelength thereof does not always coincide with the target wavelength.

Figure 4A:
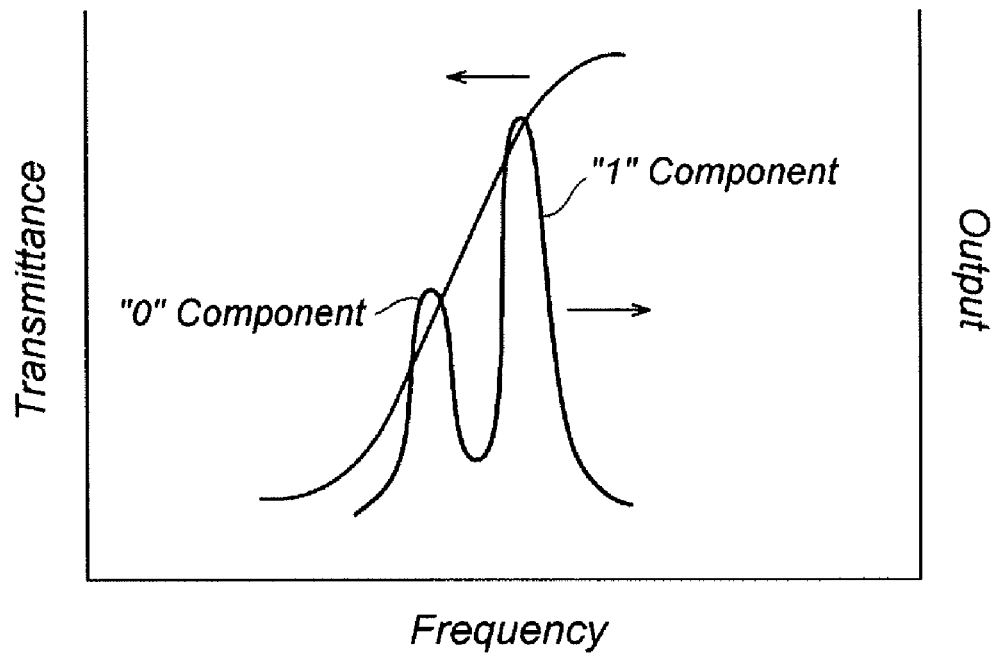
FIG. 4A schematically explains a status when the emission wavelength of the LD is in an ordinary relation with respect to the transmission spectrum of the filter.
Figure 4B:
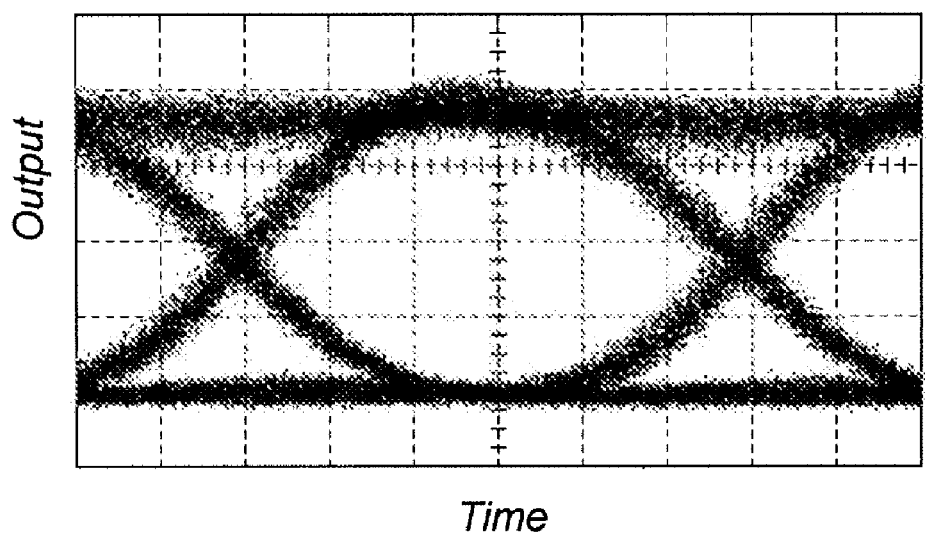
FIG. 4B is an eye-diagram of the optical signal output from the transmitter when the emission wavelength of the LD is in the ordinary relation.
Figure 5A:
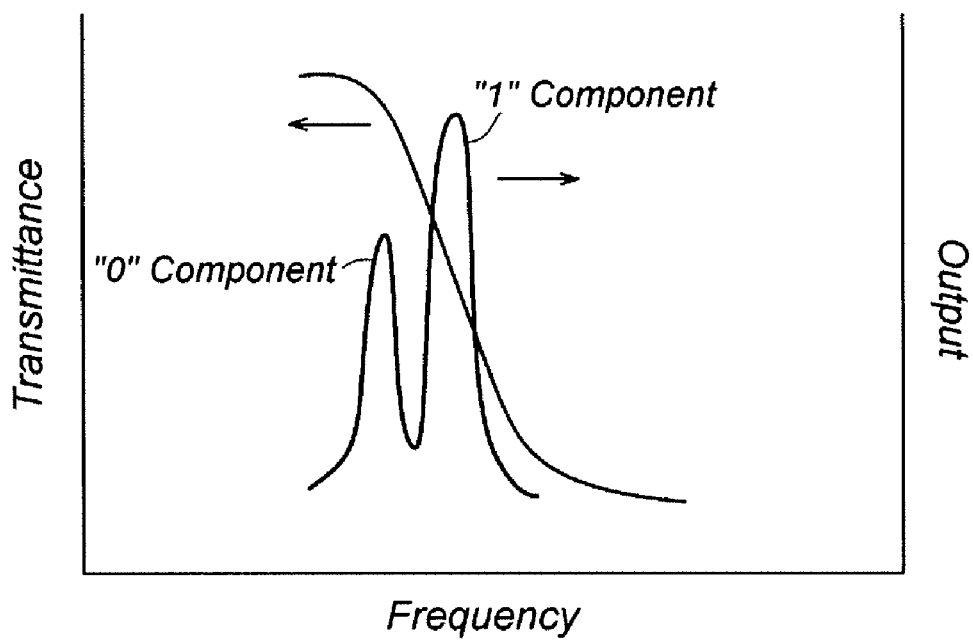
FIG. 5A schematically explains a status when the emission wavelength of the LD is in an irregular relation with respect to the transmission spectrum of the filter.
Figure 5B:
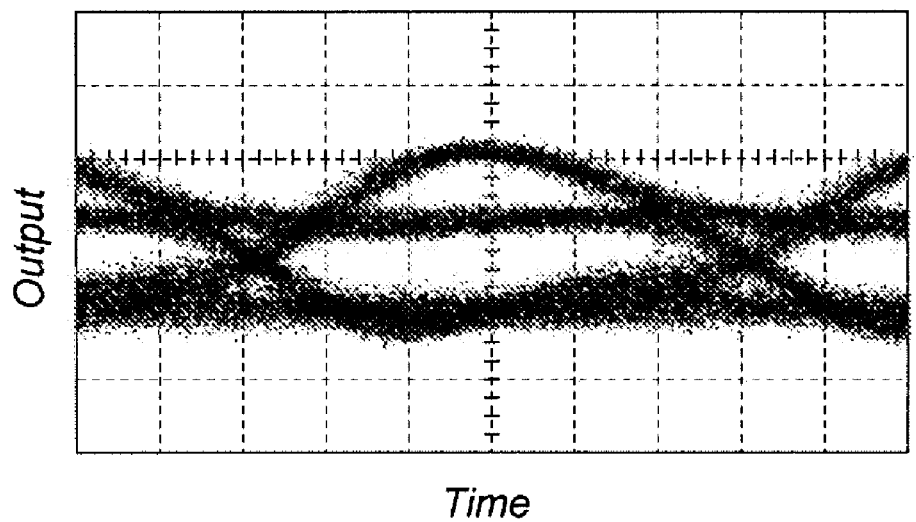
FIG. 5B is an eye-diagram of the optical signal output from the transmitter when the emission wavelength of the LD is in the irregular relation.

When the emission wavelength of the LD 2 is in an ordinary condition with respect to the transmission spectrum of the filter 4, the optical filter 4 primarily cuts the "0" component involved in the original light from the LD 2, as illustrated in FIG. 4A. In this case, the optical output of the transmitter 1, which optically couples with the fiber F, shows an enough extinction ratio as illustrated in FIG. 4B. On other hand, when the emission wavelength of the LD 2 is in a mismatched condition with respect to the transmission spectrum of the filter 4, as shown in FIG. 5A, the filter 4 cuts the "1" component of the original light from the LD 2. Consequently, the output from the transmitter 1 shows a degraded extinction ratio as illustrated in FIG. 5B.

The optical transmitter 1 according to the present embodiment first detects two optical powers, one of which is the output of the LD 2 obtained through the first PD 5 and the other is that reflected by the filter 4 obtained through the second PD 6, step S03. The light reflected by the filter 4 has a spectrum reflecting the transmission spectrum of the filter 4, that is, the spectrum of the reflected light has a plurality of reflection maxima each corresponding to the transmission minima of the filter 4. Next, the transmitter 1 compares phases of respective outputs from the first PD 5 and the second PD 6, step S04, and passes thus compared result through the low-pass filter 22.

Figure 6A:
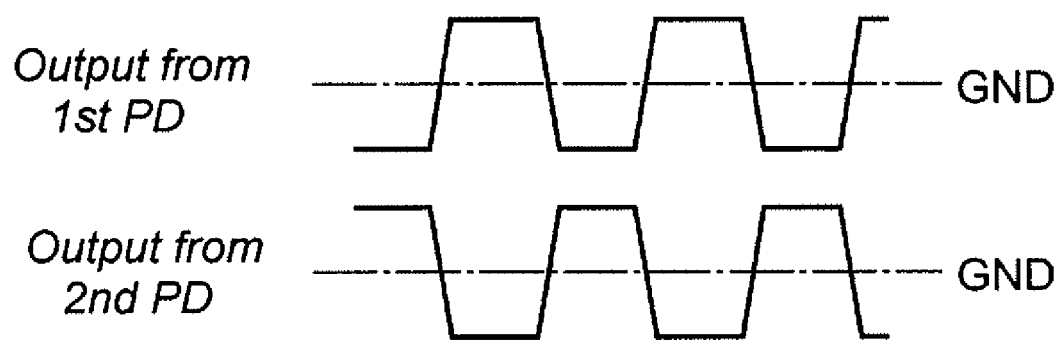
FIG. 6A schematically explains the phase relation of two signals each output from the first and second PD when the emission wavelength of the LD is in the ordinary relation with respect to the transmission spectrum of the filter.
Figure 6B:
FIG. 6B is an output of the low-pass filter when the emission wavelength of the LD is in the ordinary relation.

When the emission wavelength of the LD 2 is in a regular relation with respect to the reflection spectrum of the filter 4, where the filter cuts the "0" component of the optical signal from the LD 2, the phase of the signal output form the first PD 5 becomes opposite to that from the second PD 6, FIG. 6A. Multiplying these two signals and passing thus multiplied result through the low-pass filter 22, the output therefrom becomes negative as shown in FIG. 6B.

Figure 7A:
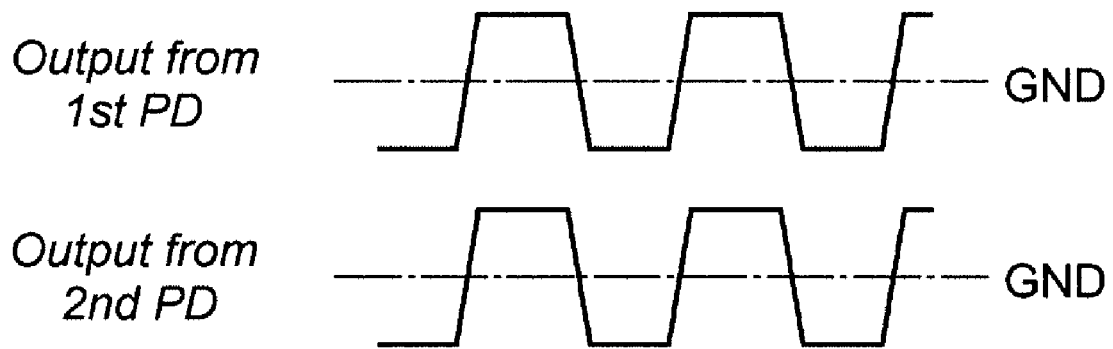
FIG. 7A schematically explains the phase relating of two signals each output from the first and second PD when the emission wavelength of the LD is in the irregular relation with respect to the transmission spectrum of the filter.
Figure 7B:
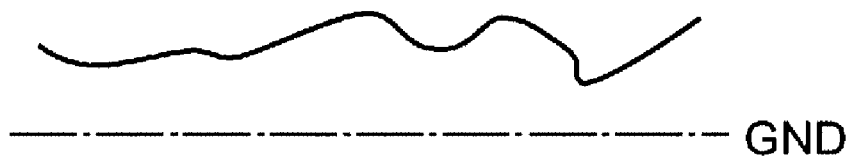
FIG. 7B is an example of the output of the low-pass filter when the emission wavelength of the LD is in the irregular relation.

On the other hand, when the emission wavelength of the LD 2 is in a irregular relation with respect to the transmission spectrum of the filter 4, the filter 4 primarily cuts the "1" component, which does not reverse the phase of the signal output from the first PD 5 to that from the second PD 6, FIG. 7A. Multiplying these two signals and passing the multiplied result through the low-pass filter 22, the output from the filter 22 becomes positive, FIG. 7B.

The output of the low-pass filter 22 is provided to the decision circuit 17, step S05, and the status of the emission wavelength of the LD 2 and the transmission spectrum of the filter 4 is decided, step S06. When the output is negative, which corresponds to a status that the emission wavelength 2 of the LD 2 is in a regular condition, the ATC circuit continues to control the temperature of the LD 2 so as to keep the output of the second PD 6 in the preset value, step S07.

When the output is positive in step S06 above, which corresponds to a status that the emission wavelength of the LD 2 is in a irregular relation with respect to the reflection spectrum of filter 4, the controller 18 lowers the target temperature of the LD 2 in the ATC loop until the output of the low-pass filter 22 becomes negative and, at the same time, the level thereof becomes minimum or the output of the second PD 6 becomes a preset value, step S08. The emission wavelength of the LD 2 shifts shorter as lowering the temperature thereof. After the condition above described is satisfied, the ATC loop adjusts and keeps the temperature of the LD 2 so as to maintain the output of the second PD 6 constant.

Thus, the optical transmitter according to the present embodiment compares the phases of the signal output from the first PD 5 and that from the second PD 6. When the compared result becomes positive, the transmitter lowers the target temperature of the LD 2 such that the signals from the first and second PDs, 5 and 6, are in out of phase to each other in advance to the practical operation of the ATC loop. According to the present invention, the emission wavelength of the LD 2 may be effectively set in an ordinary relation with respect to the transmission spectrum of the filter 4, which may secure not only an enough extinction ratio of the light but a quite narrow spectral width because the light contains only the "1" component. Accordingly, the optical communication system using the optical transmitter according to the present invention may be effectively escaped from the dispersion inherently attributed to the optical fiber F and may extend the transmission distance.

While the preferred embodiments of the present invention have been described in detail above, many changes to these embodiments may be made without departing from the true scope and teachings of the present invention. The present invention, therefore, is limited only as claimed below and the equivalents thereof.

What is claimed is:

1. An optical transmitter to output signal light, comprising:
    a laser diode for emitting modulated light;
    an optical filter with a transmission spectrum showing a plurality of transmission maxima and a reflection spectrum showing a plurality of reflection minima corresponding to said transmission maxima, said optical filter transmitting a portion of said modulated light and reflecting another portion of said modulated light;
    a first photodiode for detecting a portion of said modulated light;
    a second photodiode for detecting a portion of said another portion of said modulated light reflected by said optical filter;
    an automatic temperature control circuit to set a temperature of said laser diode in a target temperature; and
    a controller configured to lower said target temperature referred in said automatic temperature control circuit when an output of said first photodiode is in phase with respect to an output of said second photodiode until said output of said first photodiode is out of phase with respect to said output of said second photodiode.

2. The optical transmitter according to claim 1,
    wherein said filter is a Fabry-Perot Etalon filter.

3. The optical transmitter according to claim 2,
    wherein said signal light contains first and second wavelengths, said first wavelength corresponding to a state "1" and said second wavelength corresponding to a state "0",
    wherein said optical filter has a cut-off wavelength between said first and second wavelengths and primarily cuts said second wavelength to transmit said first wavelength.

4. The optical transmitter according to claim 2,
    wherein said optical filter is controlled in a temperature thereof.

5. The optical transmitter according to claim 1,
    further comprising first and second thermoelectric controllers, said first thermoelectric controller controlling a temperature of said laser diode, said second thermoelectric controller controlling a temperature of said optical filter.

6. The optical transmitter according to claim 5,
    further comprising first and second TEC drivers, and first and second thermistor,
    wherein said first thermoelectric controller, said first TEC driver and said first thermistor constitutes said automatic temperature control circuit to control a temperature of said laser diode, and wherein said second thermoelectric controller, said second TEC driver and said second thermistor constitutes another automatic temperature control circuit to control a temperature of said optical filter.

7. The optical transmitter according to claim 1, further comprising a bias supply to provide a bias current to said laser diode,
wherein said laser diode, said first photodiode and said bias supply constitutes an automatic power control circuit to set an optical power of said signal light constant.

8. A method to control a wavelength of signal light output from an optical transmitter that comprise a laser diode to emit modulated light and an optical filter with a transmission spectrum having a plurality of transmission maxima, said optical filter transmitting a portion of said modulated light to generate said signal light and reflecting another portion of said modulated light, said method comprising steps of:
   (a) detecting said modulated light output from said laser diode without interposing said optical filter;
   (b) detecting said reflected light reflected by said optical filter; and
   (c) when said reflected light is in phase with respect to said modulated light, lowering a temperature of said laser diode until said reflected light is out of phase with respect to said modulated light.

9. The method according to claim 8,
wherein said transmitter further includes a first TEC to control a temperature of said laser diode, a first thermistor to detect said temperature of said laser diode, and a first TEC driver to drive said first TEC,
wherein said first TEC, said first thermistor and said first TEC driver constitutes an automatic temperature control loop, and
wherein said step for lowering said temperature of said laser diode is carried out by lowering a target temperature of said automatic temperature control loop.

10. The method according to claim 8,
wherein said optical filter is a Fabry-Perot Etalon filter.

* * * * *